(12) United States Patent
Smith, Jr. et al.

(10) Patent No.: US 7,772,521 B2
(45) Date of Patent: Aug. 10, 2010

(54) METHOD AND SYSTEM FOR MARKING TIRES

(75) Inventors: Donald L. Smith, Jr., Brentwood, TN (US); Daniel C. Orendorf, Franklin, TN (US); Stefan A. Parks, Smyrna, TN (US); Thomas W. Bell, Akron, OH (US); Joseph J. Peters, Brentwood, TN (US); Ira L. Wood, Spring Hill, TN (US); Jason J. Para, Franklin, TN (US)

(73) Assignee: Bridgestone Americas Tire Operations, LLC

( * ) Notice: Subject to any disclaimer, the term of this patent is extended or adjusted under 35 U.S.C. 154(b) by 1264 days.

(21) Appl. No.: 10/560,850

(22) PCT Filed: Jun. 23, 2004

(86) PCT No.: PCT/US2004/020147
§ 371 (c)(1),
(2), (4) Date: Dec. 15, 2005

(87) PCT Pub. No.: WO2005/000714
PCT Pub. Date: Jan. 6, 2005

(65) Prior Publication Data
US 2006/0151451 A1     Jul. 13, 2006

Related U.S. Application Data

(60) Provisional application No. 60/480,880, filed on Jun. 23, 2003.

(51) Int. Cl.
*B23K 26/36* (2006.01)
*B23K 26/03* (2006.01)
(52) U.S. Cl. .................. 219/121.68; 219/121.69; 219/121.83

(58) Field of Classification Search .......... 219/121.68, 219/121.69, 121.82; 382/141
See application file for complete search history.

(56) References Cited

U.S. PATENT DOCUMENTS

| | | | | |
|---|---|---|---|---|
| 1,544,262 A | * | 6/1925 | Midgley | 264/245 |
| 3,455,763 A | * | 7/1969 | Sarka et al. | 156/345.21 |
| 4,304,981 A | * | 12/1981 | Gappa | 219/121.66 |
| 4,323,755 A | | 4/1982 | Nierenberg | |

(Continued)

FOREIGN PATENT DOCUMENTS

DE         003807779 A1 *  9/1989

(Continued)

*Primary Examiner*—Samuel M Heinrich
(74) *Attorney, Agent, or Firm*—Thomas R. Kingsbury

(57) ABSTRACT

A system and associated method of marking a molded vehicle tire with laser engraved information to provide both human visible and machine readable data concerning the tire. Information contained in a barcode on the tire is read at a first station and supplied to a control unit. The physical location of human visible information previously molded into the tire is read from the tire at a second station and supplied to the control unit which uses this information to position a laser located at a third station for engaging additional human visible information pertaining to the manufacture of the tire adjacent the existing visible information to satisfy the Department of Transportation (DOT) tire marking requirements. The additional information also can be laser engraved into the tire in a machine readable encoded format, such as 2D symbols, for subsequent control and verification throughout the life of the tire.

18 Claims, 5 Drawing Sheets

U.S. PATENT DOCUMENTS

| | | | |
|---|---|---|---|
| 4,343,342 A * | 8/1982 | McDonald | 152/523 |
| 4,515,867 A | 5/1985 | Bleacher et al. | |
| 4,564,737 A * | 1/1986 | Burke et al. | 219/121.68 |
| 5,061,341 A | 10/1991 | Kildal et al. | |
| 5,226,361 A * | 7/1993 | Grant et al. | 101/44 |
| 5,304,773 A * | 4/1994 | Kilian et al. | 219/121.78 |
| 5,325,582 A * | 7/1994 | Glaser et al. | 29/840 |
| 5,478,426 A | 12/1995 | Wiler et al. | |
| 5,523,125 A | 6/1996 | Kennedy et al. | |
| 5,527,407 A * | 6/1996 | Gartland et al. | 156/64 |
| 5,603,796 A * | 2/1997 | Baker | 156/272.8 |
| 6,018,860 A * | 2/2000 | Smith et al. | 29/558 |
| 6,076,738 A | 6/2000 | Bloomberg et al. | |
| 6,160,835 A | 12/2000 | Kwon | |
| 6,252,196 B1 | 6/2001 | Costin et al. | |
| 6,253,815 B1 | 7/2001 | Kemp et al. | |
| 6,259,056 B1 * | 7/2001 | Cowden | 219/121.69 |
| 6,281,471 B1 * | 8/2001 | Smart | 219/121.62 |
| 6,341,009 B1 * | 1/2002 | O'Connor et al. | 355/67 |
| 6,689,542 B2 | 2/2004 | Boissonnet | |
| 6,726,012 B2 | 4/2004 | Bielicki et al. | |
| 7,570,443 B2 * | 8/2009 | Blasenheim et al. | 359/822 |
| 2004/0134983 A1 * | 7/2004 | Oyama et al. | 235/385 |
| 2004/0159977 A1 | 8/2004 | Perfetto et al. | |
| 2004/0188399 A1 * | 9/2004 | Smart | 219/121.69 |
| 2004/0231540 A1 | 11/2004 | Hiller | |
| 2005/0205539 A1 * | 9/2005 | Borgoltz et al. | 219/121.83 |
| 2005/0263498 A1 * | 12/2005 | Hiramatsu | 219/121.7 |

FOREIGN PATENT DOCUMENTS

| | | |
|---|---|---|
| EP | 0 327 508 A2 | 8/1989 |
| EP | 1 152 904 B1 | 11/2001 |
| JP | 2000-084681 | 3/2000 |
| JP | 2001-113608 | 4/2001 |

* cited by examiner

METHOD AND SYSTEM FOR MARKING TIRES

CROSS REFERENCE TO RELATED APPLICATION

This application claims the benefit of provisional application Ser. No. 60/480,880 filed Jun. 23, 2003.

BACKGROUND OF THE INVENTION

1. Technical Field

The invention relates to vehicle tires, and in particular to the marking of tires to satisfy governmental requirements and to provide additional inventory and historical data pertaining to each individual tire.

2. Background Information

Vehicle tires, particularly those intended for highway use, are required to be marked with certain data on the exterior of one of the sidewalls, generally adjacent the bead area of the tire, by the Department of Transportation (DOT) in human visible and readable characters. Heretofore, the data that was required to be molded on the sidewall consisted of the particular plant code in which the tire is manufactured, the tire size, tire line or type of tire, and week and year the tire was molded. This coded information, in the form of human readable numerals and/or letters, was easily applied to the tire during molding by placement of engraving strips on the inside of the tire curing mold. These code designations did not change appreciably, and thus was not difficult to incorporate into the curing mold for subsequent embossing or depressing into the sidewall of the cured tire. However, recent governmental legislation requires that complete DOT information, including the week and year in which the tire is molded, be molded on the intended outboard sidewall of the tire, and that partial DOT information (complete DOT less the week and year of molding) be molded on the external surface of the intended inboard sidewall of the tire. The addition of this DOT data and placement on both the inboard and outboard sidewalls of the tire will increase the cost of the tire molding or curing operation, especially for certain types of molds due to the constant replacement of the engraving strips or plugs in the mold each week on each press, and the difficulty of placing such information in the molds for molding on the intended outboard sidewall of the tire for certain types of molds.

In addition to marking vehicle tires with the required DOT data, it has become desirable to mark each tire with its own specific serial number, as well as additional manufacturing information pertaining to the tire for use in inventory control, warranty verification, customer satisfaction, and counterfeiting problems. However, the placement of such additional tire data on the sidewall of the tire increases the cost of producing the tire by the insertion and removal of the engraving strips in the curing presses or subsequent application of bar code strips on the tire, or electronic identification chips inside the tire. Also, it is desirable to be able to place much of this additional information or data on the tire in a non-human visible form and in an unobtrusive form so as not to distract from the appearance of the sidewall. However, it is necessary that this can be easily retrieved by machine readable retrievers for storage in a database or printable in hardcopy, yet which cannot be readily obtained by unauthorized sources.

Another problem that exists with the marking of tires by engraving or embossing the information thereon is that over the life of the tire, a portion of this data can become illegible due to wear and tire damage, preventing the desired data to be subsequently retrieved from the tire, especially as the tire ages.

However, recent developments in data encoding, referred to generally as encoded or 2D matrix symbology, enables a considerable amount of data to be placed on a surface of an object in a very unobtrusive manner, and which may be machine readable, even after a portion of the encoded data has been damaged or destroyed on the article. One such type of encoded symbology is the use of glyphs in a self-clocking glyph code. U.S. Pat. No. 6,076,738 discusses many features of this self-clocking glyph shaped codes and its manner of application and retrieval from an object. Another type of 2D encoding is referred to under the trademark DATA MATRIX.

BRIEF SUMMARY OF THE INVENTION

The present invention provides a method and system for marking vehicle tires with either human readable data or encoded machine readable data or a combination of both, in order to satisfy DOT requirements and to provide additional information for each individual tire, which data is located at specific locations on the tire and which hopefully will be obtainable from the tire throughout its life.

The present invention enables the data to be applied to the exterior surface of the inboard or outboard sidewalls of a tire by laser engraving, avoiding or reducing the placement of engraving strips in the mold, and in which data can be applied after the tire has been molded, such as the week and year the tire is molded as required by the DOT, and which can be automatically placed at the correct location on the tire adjacent DOT data which is molded into the tire during curing; and in which the laser engraving of such information can be less expensive than retrofitting some molds with the needed data on insert molding strips or plugs.

Another aspect of the invention is the use of encoded digital data, such as in the shape of 2D barcodes or other type of encoded symbology, that are laser engraved into the tire in such a manner that even should the data recording field be damaged or worn over time, it may still enable the recorded data to be obtained therefrom, and in which such data, when placed on the tire, is unobtrusive and does not detract from the appearance of the sidewall, and if desired can be incorporated as an ornamental background feature in the tire.

Still another aspect of the invention is that the laser encoded data, including human readable, can be machine read and retrieved for subsequent electronic storage and reproduction onto hardcopy, and in which each individual tire can be marked to provide for a complete history of the tire from molding to its final destruction.

Another advantage of the present invention is to provide a system which has several work stations, one of which detects the location of existing DOT data characters which had been molded into the tire and/or a barcode strip previously placed on the tire when in its green state, and uses this location for positioning the tire and/or a laser so that subsequent applied data is correctly positioned adjacent the existing molded data, and to use the existing data location to subsequently reposition the tire and/or laser for engraving the coded characters or symbols thereon, either adjacent to the human readable DOT data or placement at any desired location on the tire sidewalls to avoid materially effecting the appearance of the sidewalls.

Still another feature of the invention is to read the existing manufacturer's bar code, which has been placed on the tire during its initial manufacture for storage in the history of each individual tire.

A further feature of the invention is to provide a verification reader for both the encoded information and the human readable data at the laser engraving station to insure that the desired data has been properly engraved on the tire before the tire is removed from the engraving station for subsequent transfer to a control or inspection station.

Still another feature of the invention is to enable each tire to be easily encoded with its own personal identification or serial number, and in which the encoded data includes safeguards to prevent its retrieval by unauthorized sources to avoid counterfeiting and warranty problems.

Another feature of the invention is to provide an exhaust system at the engraving station to collect any fumes and debris created during the engraving of the tire with the desired data, to prevent its escape into the surrounding atmosphere.

The foregoing advantages, construction and operation of the present invention is performable with available hardware and software, and can be placed on the tire in seconds so as not to slow down the tire manufacturing process, and in which such advantages are more readily apparent from the following description and accompanying drawings.

BRIEF DESCRIPTION OF THE DRAWINGS

Similar numerals refer to similar parts throughout the drawings.

DETAILED DESCRIPTION OF THE INVENTION

Figure 1:
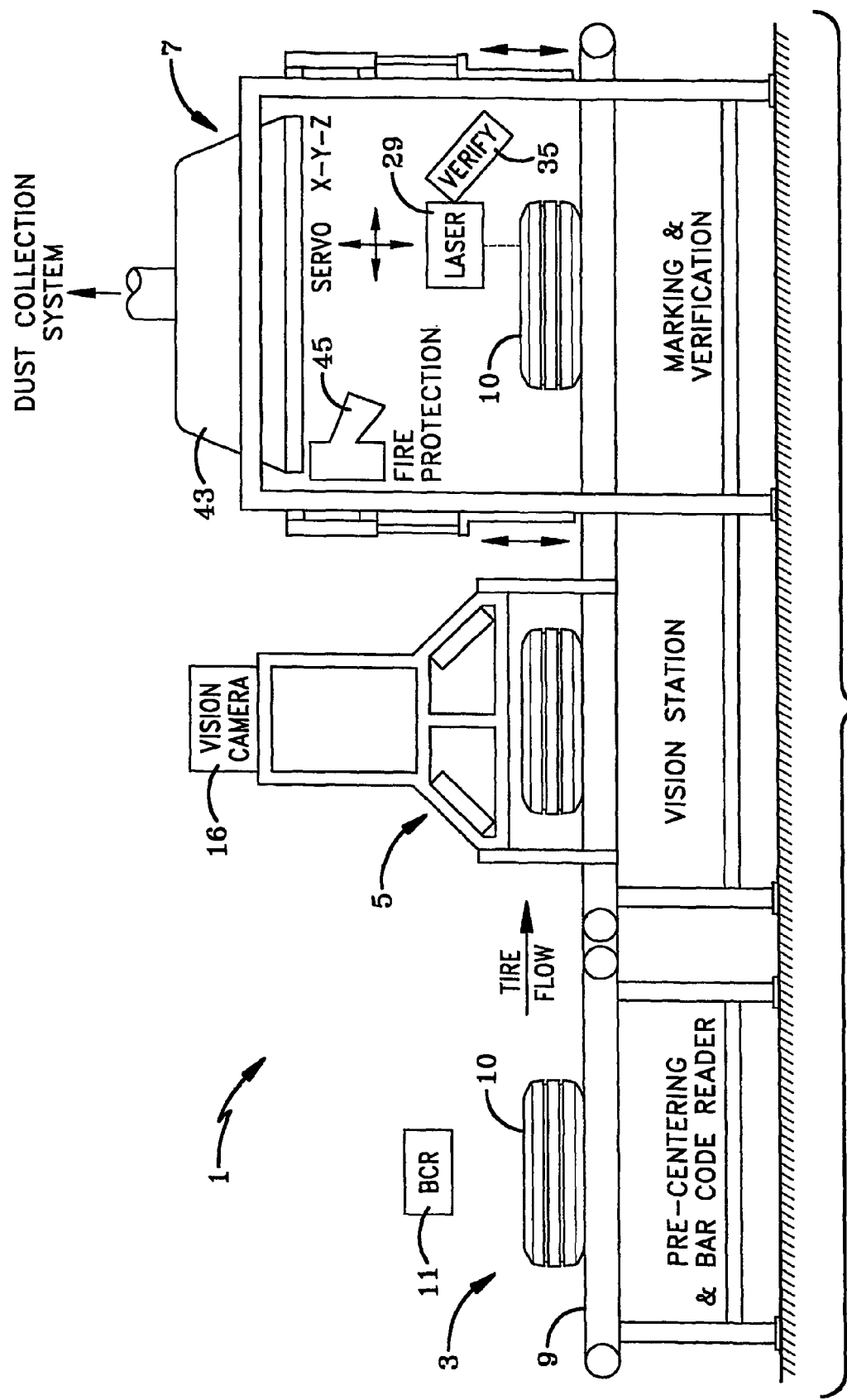
FIG. 1 is a diagrammatic side elevation of the multi-station system of the present invention for marking tires.
Figure 3:
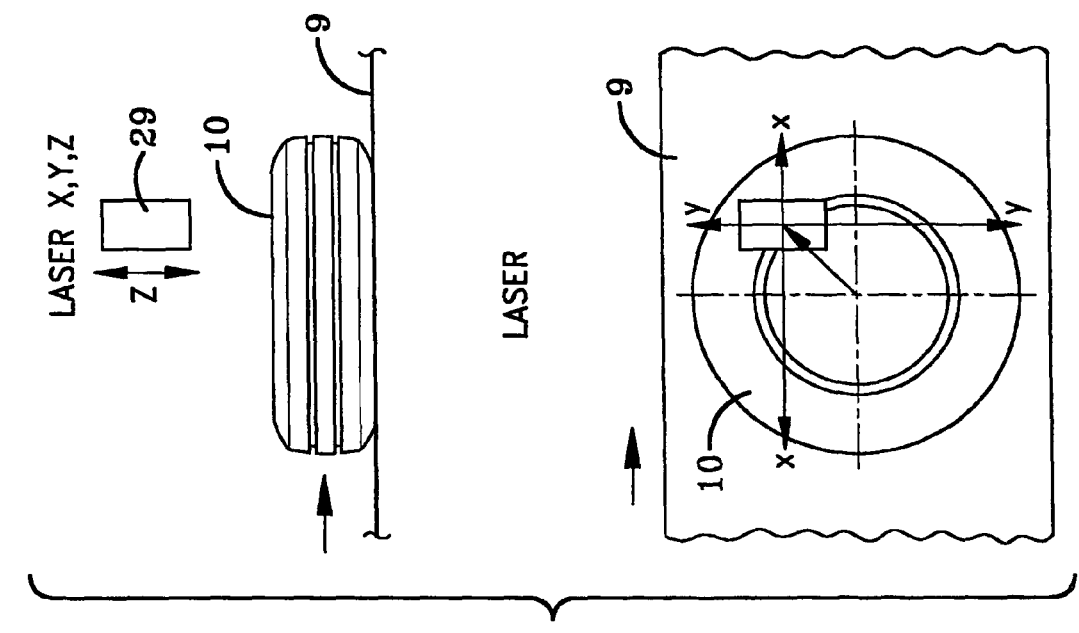
FIG. 3 is a diagrammatic elevational and plane view of the laser engraving station of the present invention.
Figure 2:
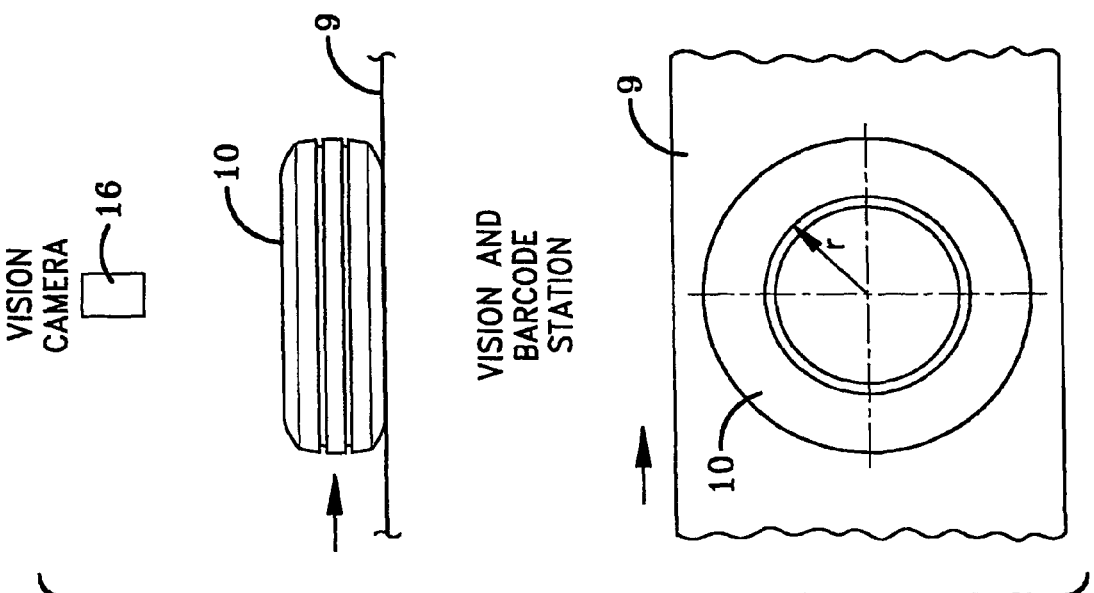
FIG. 2 is a diagrammatic elevational and plane view of the barcode and camera inspection of the present invention.

One form of the improved system of the present invention for the marking of tires is shown diagrammatically in FIG. 1 and is indicated generally at 1. System 1 includes a first station indicated generally at 3, referred to as the pre-centering and barcode reader station; a second station indicated generally at 5, referred to as the vision station; and a third station indicated generally at 7, referred to as the marking and verification station. All of these stations are connected by a tire transport mechanism indicated generally at 9, such as a conveyor or other apparatus for moving a cured tire 10 between the stations.

Figure 4:
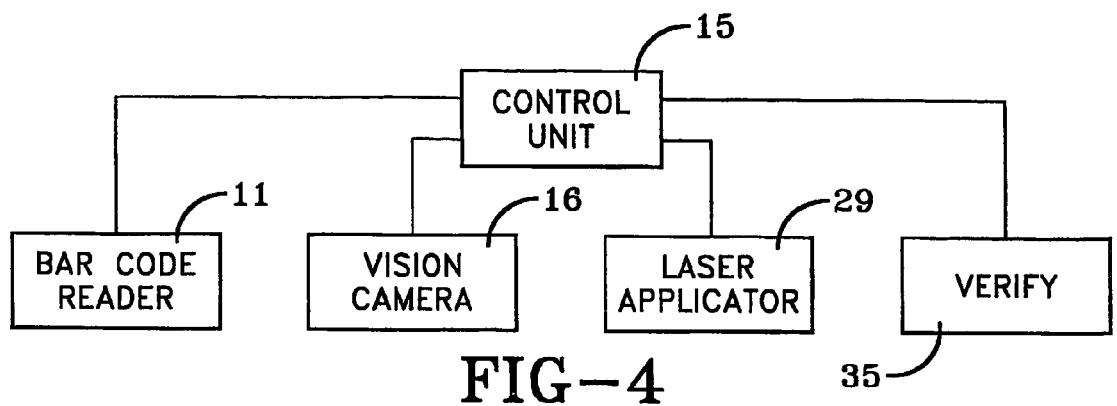
FIG. 4 is a simplified block diagram of the processing of the obtained information for carrying out and taking advantage of the various aspects of the present invention.
Figure 5:
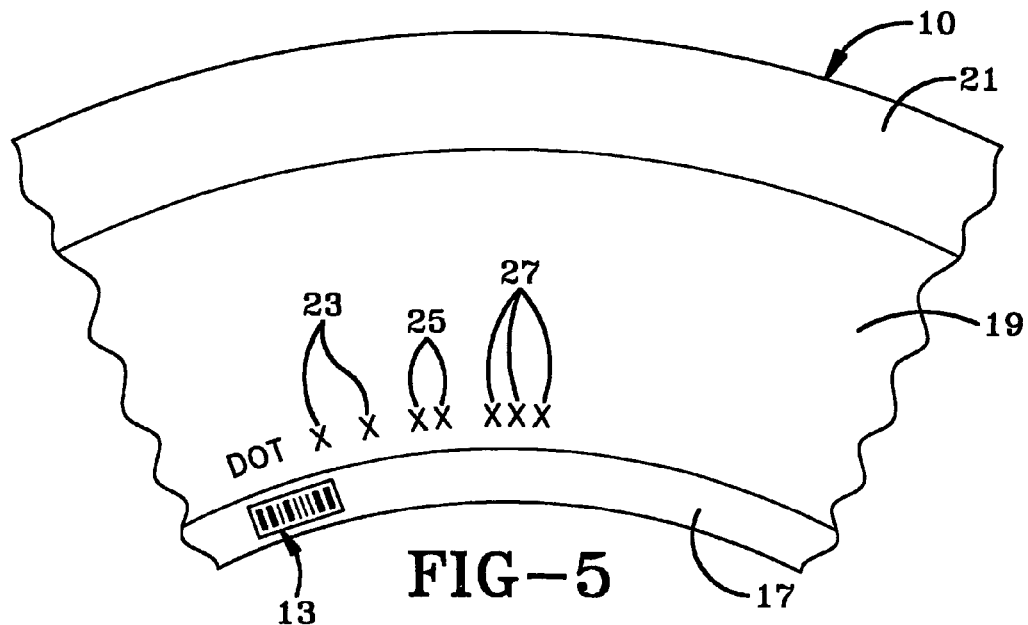
FIG. 5 is a fragmentary elevational view of a portion of a tire sidewall containing barcode and part of the DOT required data molded into the tire, when the tire is located at the stations as shown in FIGS. 2 and 3.

Station 3 contains a barcode reader 11 for reading the indicia contained on a usual barcode strip 13 which has been attached to the tire as shown in FIG. 5 upstream of station 3. Barcode strip 13 contains various coded indicia or information, such as the type of tire, individual serial number for the tire, the particular manufacturing plant I.D., and even the particular curing press in which the tire was cured. This information is read by barcode reader 11 and supplied to a control unit 15 (FIG. 4) for storage and subsequent use in the marking system of the present invention.

Figure 6:
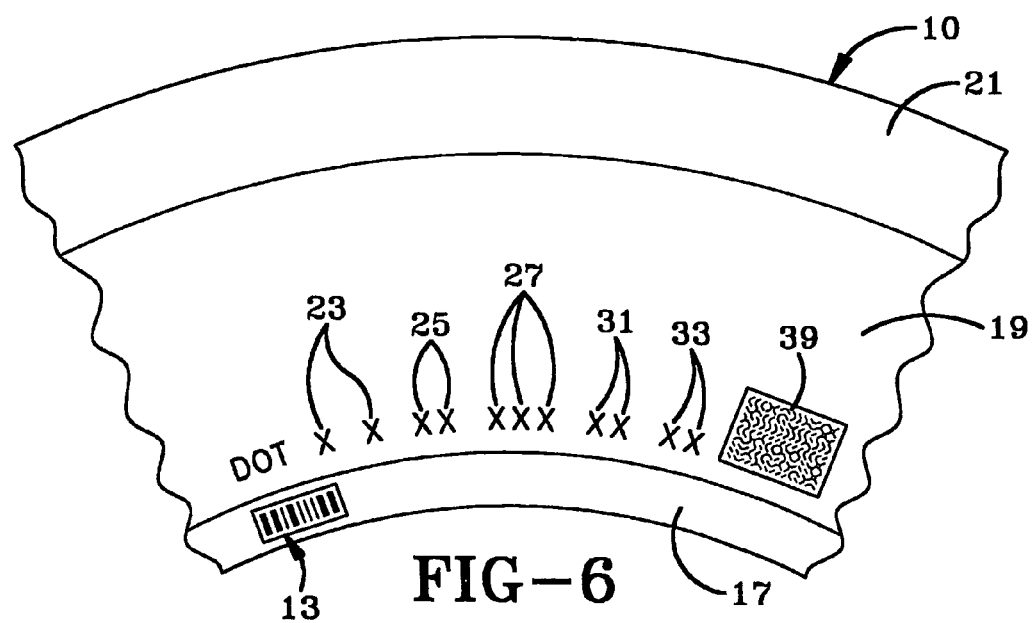
FIG. 6 is a fragmentary elevational view similar to FIG. 5 of a portion of the tire sidewall after the required human visible DOT data and a 2D symbol field has been engraved thereon.

The tire moves along conveyor 9 to vision station 5 wherein a vision camera system 16 will read the human visible printed indicia or characters, which have been molded into the tire. These characters are located at a specific location as required by the Federal Department of Transportation (DOT) and are shown diagrammatically in FIG. 5. FIGS. 5 and 6 are fragmentary sections of tire 10 which include a bead area 17, a sidewall 19, and a tread shoulder 21. As discussed above, certain DOT information will be molded on the outside sidewall surface of both the inboard and outboard sidewalls of the tire. The complete DOT code is eleven human readable characters, either numerals or letters to be placed on the tire following the letters DOT. The first two digits are the plant code where the tire is manufactured and is indicated at 23. The next two digits represent the tire size and are indicated at 25. The next three digits are the tire line code and are indicated at 27. These code characters or indicia are molded into the tire at a specific location in the sidewall, generally adjacent bead area 17, in the curing press by the use of molding strip inserts. These characters do not change appreciably. Therefore, once the mold strips are inserted into the mold they can remain for a considerable number of tires before requiring replacement. This information is obtained from the tire by the vision camera system 19 or optical readers at station 5, and are supplied to control unit 15. Vision camera system 16, or other type of optical reader, in addition to reading the DOT characters on the tire, will determine their location and will compute distance "r" and angle from a specific reference spot, such as the location of the last character molded into the tire as shown by numeral 27, FIG. 5. Also, the location of barcode 13 could be used for the subsequent laser engraving of information on the tire. The barcode strip location, which can vary on each tire, can also be read by camera 16. This information is supplied to control unit 15 for subsequent use in positioning a laser engraver as discussed above. The tire then continues to move along conveyor 9 and into the third station 7.

A laser applicator or engraver 29 is adjustably mounted at station 7 by an adjustment mechanism (not shown) which enables it to be moved in the X, Y, and Z planes so that the laser beam can be properly positioned in the X and Y direction for engraving the additional required data on the tire as shown in FIG. 6. Adjustment in the Z direction will adjust for the focal length of the laser beam. As discussed above, this positioning can be determined and regulated by the positions of barcode strip 13 and/or the location of a partial DOT code, or any other molded feature of the tire.

The additional data required by the DOT, which is placed on the tire in station 7, consists of the week and year indicated at 31 and 33 (FIG. 6), in which the tire is molded. The position of data or indicia 31 and 33 is required to be adjacent tire code data 27. This can be achieved by several means, such as by reading the location of any of the indicia 23, 25, and 27 at station 5, information is supplied to control unit 15 which then is supplied to the laser adjustment mechanism at station 7 which automatically adjusts laser applicator 29 so that the laser beam engraves the indicia at the correct location shown in FIG. 6. Also, the location of barcode strip 13, as discussed above, can be read by camera system 16 at station 3 and supplied to control unit 15, which in turn is supplied to the laser adjustment mechanism for a guide in engraving the indicia 31 and 33. Thus, as the tire is advancing from station 5 to station 7, the necessary adjustments are being made to properly position laser applicator 29 so that it is ready to begin engraving the required data upon tire 10 reaching a stopped position in station 7.

Station 7 is also provided with a verifying reader 35 which immediately reads data 31 and 33 just engraved on tire 10, as well as the previously applied data 23, 25, and 27, to insure that the correct data has been applied to the correct tire and that the information is readable and obtainable from the tire. If not, the tire will be rejected for remarking or other corrective action. Preferably, a dust collection system indicated generally at 43 is provided at station 7 to remove any fumes and/or debris generated during the laser engraving of the tire. Likewise, a fire protection system 45 can be incorporated therein as a safety precaution due to the burning of the rubber during the laser marking of the tire.

If desired, the actions performed and results achieved at stations 3 and 5 can be combined and achieved at a single tire centering and reading station without effecting the concept of the invention.

In further accordance with the invention, an encoded symbol such as a self-clocking glyph code 39, data matrix, or other types of encoded symbology, hereinafter referred to as a 2D symbol, can be used for subsequent engraving on sidewall 19, either adjacent to the DOT engraved data, or at any desired location on the sidewall area. These 2D symbols enable a substantial amount of data to be engraved into the tire in a relatively short period of time and have various safeguards built into the code, such as a considerable redundancy so that if part of the code is destroyed or worn away over use, the encoded information can still be retrieved. Likewise, the encoded data can contain a personal identification code that prevents unauthorized retrieval of the coded material.

One particular advantage of encoding the tire with the 2D symbol is that it can include additional information to that contained on the barcode, including an individual serial number for the tire which will remain on the tire throughout its life. Also, other types of information can be added after molding, which is not possible with the barcode, since the barcode is applied to the tire prior to molding. Also, the barcode is more susceptible to damage over the life of the tire and the information: contained therein may not be retrievable later on during the life of the tire. Also, the 2D symbol field is relatively unobtrusive when marked on the tire. If desired, it can be incorporated into some of the lettering of the tire manufacturing company or logo and will be completely unnoticeable to a casual observer of the tire sidewall. Also, the same laser applicator 29 used for applying the required DOT last four characters can be used for encoding the 2D symbol. If desired, a second laser located at station 7 can be used for applying the 2D symbol, or a 2D symbol applying laser could be at a fourth station downstream from station 7. Also, 2D symbol 39 could be engraved after the tire has even passed through the various inspection and uniformity test stations and additional information placed thereon, such as the tire conicity, or information personal to the ultimate customer or purchaser of the tire if known, such as fleet operators. The application of the 2D symbols by laser applicator 29 is considerably faster than the application of the human readable information, such as indicia 31 and 33, thereby increasing its cost effectiveness, and enabling a considerable amount of information to be placed on the tire in a relatively small space which is less susceptible to damage and non-readability throughout the tire life.

The 2D symbols can store up to 600 times more data within a given space than traditional barcodes and can be placed unobtrusively in logos, trademarks, and graphic backgrounds on the sidewall of the tire and can be read on curved surfaces and can contain redundant data that enables the original content to be recaptured, even after the 2D symbol area has sustained substantial damage. 2D symbols are a technology for encoding machine readable data onto a variety of surfaces and encodes information into thousands of tiny individual elements. The use of 2D symbols reduces counterfeiting and increases inventory control and provides accurate real time warranty verification and insures accurate and tamper-proof direct marking of the tires and provides birth-to-death data of each individual tire having its own specific serial number.

The system of the present invention enables the tire manufacturers to meet the DOT requirements without modifying existing molds and in a minimum time and without marring the appearance of the sidewall of the tire. The engraved codes also provide for an automated data collection system, eliminating human error, and enables all of the material to be stored in an electronic database from which hardcopies can be produced if desired. It also enables accurate control of the tire as it moves through the manufacturing, testing, and inspection stations. The various equipment used for placing the machine readable codes and DOT indicia are laser applicators readily available and well known in the industry. Likewise, the other types of equipment, such as barcode reader 11 and the vision camera or reader 16 at station 5, is readily available hardware, thus avoiding the need for specially designed equipment for incorporation into the system of the present invention.

The laser engraving system of the present invention can also be used to engrave either human readable characters or machine readable characters, such as 2D symbols, or a combination of both, at various locations on the tire, and particularly on the external surfaces of both the intended inboard and outboard sidewalls of the tire.

Figure 7:
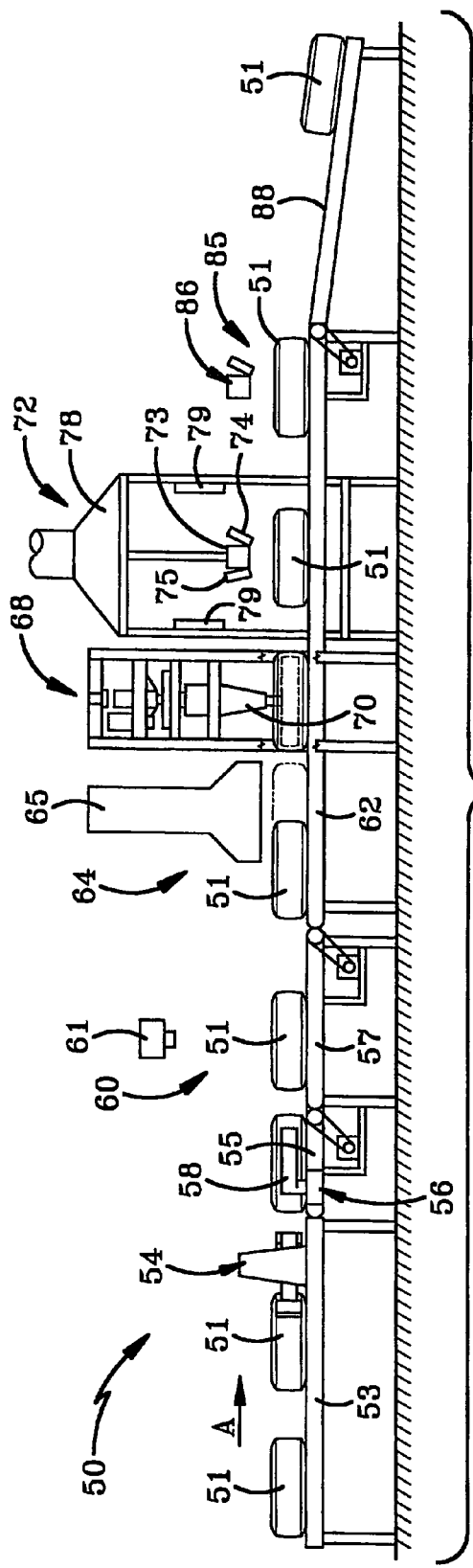
FIG. 7 is a diagrammatic side elevational view of a second embodiment of the system of the present invention.
Figure 8:
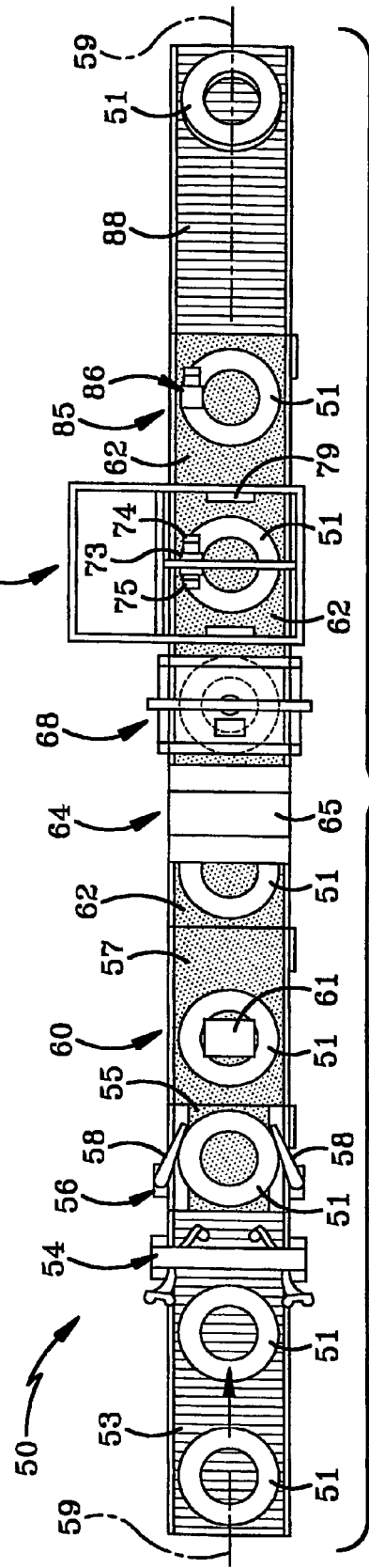
FIG. 8 is a top plan view of the system shown in FIG. 7.
Figure 9:
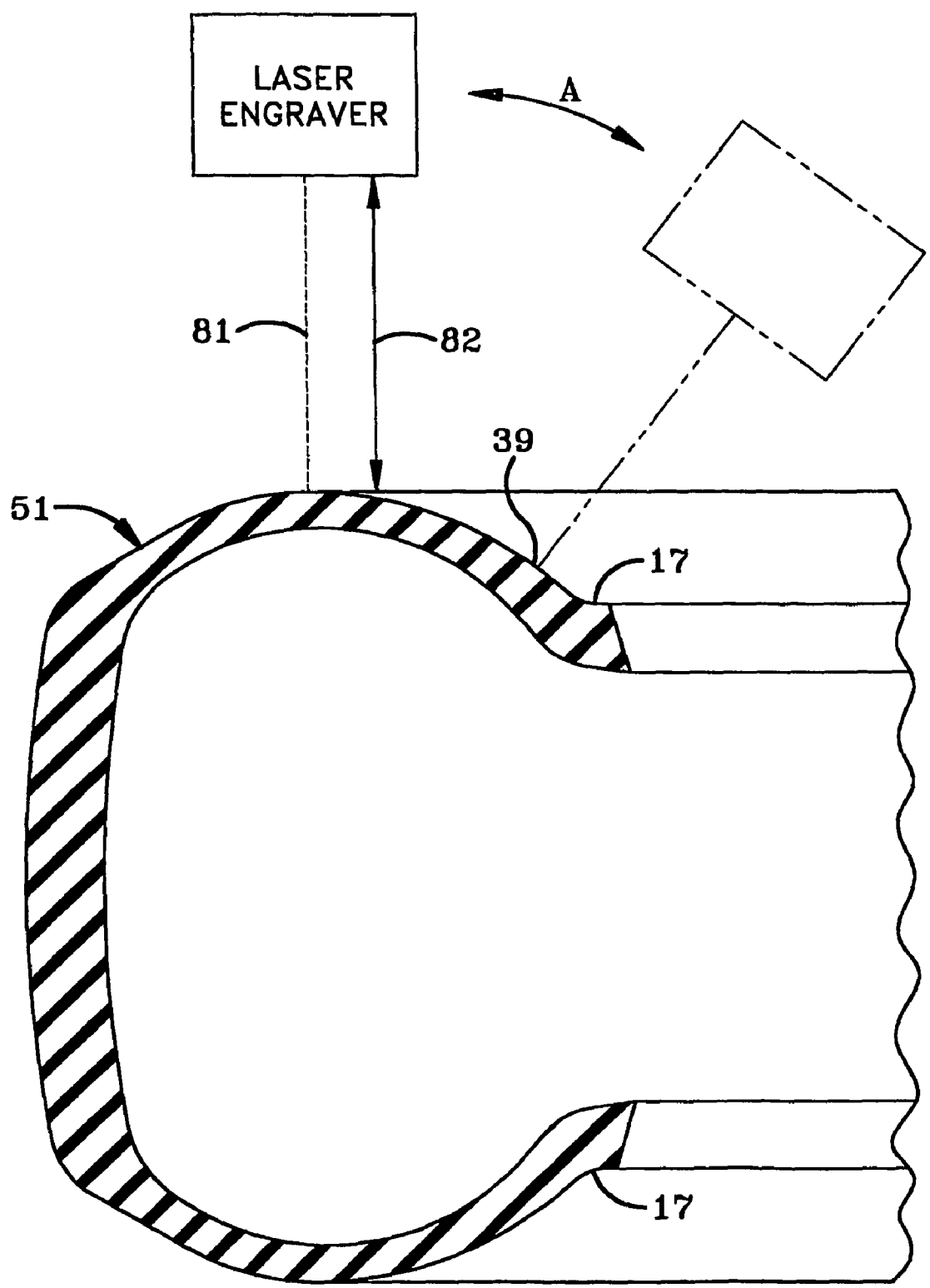
FIG. 9 is an enlarged fragmentary view showing adjustment of the laser engraver with respect to the sidewall of the tire.

A modified system of the present invention is indicated generally at 50, and is shown in FIGS. 7-9. The main feature of this embodiment is that a tire 51 is pre-positioned to be at a certain orientation when arriving at the laser application station. This requires the laser engraving apparatus for marking the tire to the moved only in certain directions for engraving the indicia thereon instead of mounting the laser engraver on a more complicated motion control apparatus. System 50 includes a first power driven inlet conveyor 53 which moves tire 51 therealong in the direction of arrow A. An escapement device or control gate 54 controls the spacing of a plurality of tires and insures that only a single tire passes to the next station and apparatus. Control gate 54 is a well known piece of equipment in the tire industry and thus is not described in greater detail.

Tire 51 passes through control gate 54 onto another conveyor 55 and then through a lateral centering device 56. Device 56 consists of a pair of interconnected guide rails or arms 58 which centers the tire laterally with respect to the longitudinal axis 59 of conveyor 55. Laterally centered tire 51 then moves past centering device 56 onto another conveyor 57 and into a first read station indicated generally at 60. Station 60 contains longitudinal centering logic and uses a camera and lasers, shown collectively at 61, for determining the O.D., I.D., height, and sidewall profile of the tire. As tire 51 enters station 60 and is moving the tire is measured using photo eyes and logic that calculates the O.D. The O.D. is then halved and this position on the tire is then the command stop position for centering the tire in station 60. Once stopped several pictures of the tire are taken by the camera. First a picture of the tire with no additional light, then two different pictures are taken with two different visible laser lines projected across the tire sidewall in two different locations. With these pictures the control system determines the sidewall profile as well as all other dimensional and position data on the tire. The control system also confirms that the tire is centered both laterally and longitudinally on the conveyor in station 60.

After the appropriate pictures and laser readings are taken on tire 51 at station 60 it is moved along and onto another conveyor 62 located at a line scan station 64, where it assumes an at-rest stopped position at the start of conveyor 62, as shown in full lines. This temporary stopping of tire 51 assists in controlling the cycle time of the marking system. Tire 51 after a short rest time moves laterally along conveyor 62 to a location beneath a high resolution line scan camera 65. Using the data developed at read station 60 and with the high resolution line scan picture taken at station 64, it enables the control system to determine how to rotate the tire at a tire rotation station 68 located downstream of and adjacent to line scan station 64. The three servo positions required for controlling an engraving lasers at a subsequent engraving station 72 are determined by the control unit from the information and data obtained at line scan station 64 so that as tire 51 reaches rotation station 68 the engraving lasers are being adjusted. The tire stops at a rotation device 70 in station 68 which descends into the I.D. of the tire. Device 70 expands and grips the tire, and then lifts the tire and rotates it to the control position provided by the control unit and then lowers the tire back onto the conveyor. The gripping device then contracts and the rotation device is lifted clear of the tire.

Tire 51 upon leaving rotation station 68 is then correctly positioned laterally on the conveyor and at the desired rotational position whereby the exact reference position on the tire which is known to the control unit, is at the desired location for subsequent placement of indicia at a specific location on the tire. Tire 51 then is moved by conveyor 62 into a laser applicator or engraving station 72. Station 72 contains a laser 73, three laser positioning servos 74, three cameras 75, and four lighting systems. Station 72 also may be equipped with a dust/fume collection hood system 78 and a fire protection system 79. As discussed above, laser 73 will be positioned to the control position as the tire reaches station 72. The tire arrives at station 72, both centered laterally and longitudinally on the conveyor, so that the three axis control system of the laser moves the laser laterally across the conveyor to adjust for different diameter tires (Y axis), the height is adjusted to adjust for tires of different widths (Z axis), and the laser is rotated about an axis (A axis) parallel to the direction of the conveyor (X axis) to adjust for different angles of presentation of the area of the tire to be engraved In accordance with another feature of the invention as shown in FIG. 9, the three axis servos are adjusted so that laser beam 81 is always perpendicular to the surface of the tire to be engraved and that the correct focal distance 82 is achieved. After laser 73 has applied the desired indicia on the tire, whether it being human readable indicia such as numerals, or machine readable coded indicia, such as 2D symbols, the tire moves to a verification station 85. Station 85 contains verification equipment 86, which may consist of the appropriate cameras and lasers, which will verify the indicia just engraved onto the tire, as well as the previously applied data, to ensure that the correct data has been applied to the correct tire and that the information is readable and obtainable from the tire as discussed above with respect to station 7 and verifying reader 35. If incorrect the tire will be rejected for remarking or other corrective action taken. Apparatus may also be provided at verification station 85 (not shown) for cleaning the area engraved before the tire is removed from station 85 along another conveyor 88 for subsequent transport to a storage or transport site. If desired, the verification equipment and cleaning equipment discussed above with respect to station 85, can all be located at laser application/engraving station 72 without affecting the concept of the invention.

In accordance with another feature of system 50, the various stations are spaced at a known distance, generally equally apart, and the individual conveyor sections are synchronized through the control unit so that a plurality of tires move in unison and at a known rate through the entire system on the various conveyors. Again, the particular control system is similar to that discussed above and shown in FIG. 4, where the various stations and components thereof are connected to a main control unit 15 which is provided with the appropriate software for controlling the motion of the equipment at each of the stations. A key or central location on the tire is initially picked as the reference point, such as a paper bar code, any of the printed indicia on the tire, such as shown in FIGS. 5 and 6, or other physical location of the tire. With this position as a control point, the control unit will use the data obtained from the line scanners and cameras at the various stations for rotating the tire to the desired rotational position so that as the tire arrives at the engraving station the projected beam will engrave the appropriate indicia, whether human readable or machine readable, at the desired location, either adjacent the existing indicia as shown in FIG. 6, or at a completely separate location on the tire.

The system of FIGS. 1-6 moves a tire through the system and the desired data is scanned and obtained therefrom, which is then fed to the laser positioning servos which move in the necessary direction in order to engrave or burn the desired indicia into the tire at a desired location. Whereas in system 50, the tire is located so that the laser is already in position to engrave the desired indicia at the specific location of the tire, with the position of this printed indicia being known from the appropriate control signals provided to the control unit by the various laser, cameras and rotational device acting on the tire as it moves through the system. Laser station 72 also is equipped with lasers and cameras which act upon the tire as it is moved into position at the engraving laser to verify that the area on the tire is ready to be engraved and is at the correct location.

Again, at the start of the marking process, a known position or control key is chosen on the tire with all of the various readings subsequently obtained from the tire coordinated with this control position, so that the area to be engraved is at a specific location on the tire having been coordinated with the control position.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A system for marking a vehicle tire comprising:
a control unit;
a first station;
a first reader including a camera and a laser located at said first station for determining physical characteristics of the tire and for reading a reference position on the tire and supplying said physical characteristics and reference position to the control unit;
a second station;
a laser applicator located at the second station for applying indicia at a specific location on the tire; and
a positioning mechanism including a rotational device for rotating the tire for correct placement and alignment of the tire with respect to the laser applicator based upon information received from the first reader for applying the indicia at the specific location by the laser application.

2. The system defined in claim 1 wherein the positioning mechanism for the laser applicator is movable in X-Y-Z coordinates.

3. The system defined in claim 1 wherein the physical characteristics of the tire determined at the first station is the O.D., I.D., height and sidewall profile of the tire.

4. The system defined in claim 1 including a second camera located at a third station for providing a high resolution line scan picture of the tire and for providing said scan picture to the control unit.

5. The system defined in claim 1 wherein the reference position on the tire read by the first reader is a machine readable barcode.

6. The system defined in claim 5 wherein the barcode contains information identifying the particular manufacturing plant making the tire, type of tire, and individual serial number identifying said tire.

7. The system defined in claim 1 wherein the reference position is human readable indicia on the tire.

8. The system defined in claim 7 wherein the human readable indicia identifies the manufacturing plant, tire size, and tire line.

9. The system defined in claim 1 wherein the indicia applied to the tire by the laser applicator is human readable and identifies the week and year that said tire is cured.

10. The system defined in claim 1 wherein the indicia applied to the tire by the laser applicator is a machine readable 2D symbol.

11. The system defined in claim 1 wherein the first reader reads information contained on the inboard and outboard sidewalls of the tire.

12. A method for marking a vehicle tire comprising the steps of:
a) reading information contained on the tire including indicia molded into the tire or a barcode strip, and reading physical characteristics of the tire, at a first station and supplying said information and physical characteristics to a control unit;
b) moving the tire to a second station;
c) providing a laser marking device at the second station;
d) coordinating the position of said laser marking device and the tire in response to the information on the tire and to the physical characteristics of the tire read at the first station; and
e) laser engraving additional information at a specific location on the tire at said second station.

13. The method defined in claim 12 wherein step (d) includes rotating the tire to coordinate with the position of the laser marking device.

14. The method defined in claim 12 wherein step (d) includes moving the laser marking device in X-Y-Z coordinates for engraving the tire at the specific location in step (e).

15. The method defined in claim 12 wherein step (e) includes engraving machine readable coded information on the tire at said second station.

16. The method defined in claim 12 wherein step (e) includes engraving machine readable 2D symbols on the tire at said second station.

17. The method defined in claim 12 wherein the step of determining certain physical characteristics of the tire include calculating the O.D., I.D., height and sidewall profile of the tire.

18. The method defined in claim 12 including the step of adjusting a laser engraver with respect to the tire such that a laser beam is perpendicular to a surface of the tire being engraved and at a correct focal length.

* * * * *